(12) United States Patent
Hong et al.

(10) Patent No.: US 10,461,630 B2
(45) Date of Patent: Oct. 29, 2019

(54) REDUNDANCY CONTROL METHOD OF MMC FOR HVDC

(71) Applicant: HYOSUNG HEAVY INDUSTRIES CORPORATION, Seoul (KR)

(72) Inventors: Jung Won Hong, Bucheon-si (KR); Yong Hee Park, Anyang-si (KR); June Sung Kim, Anyang-si (KR)

(73) Assignee: HYOSUNG HEAVY INDUSTRIES CORPORATION, Seoul (KR)

( * ) Notice: Subject to any disclaimer, the term of this patent is extended or adjusted under 35 U.S.C. 154(b) by 0 days.

(21) Appl. No.: 16/067,466

(22) PCT Filed: Jun. 22, 2016

(86) PCT No.: PCT/KR2016/006638
§ 371 (c)(1),
(2) Date: Jun. 29, 2018

(87) PCT Pub. No.: WO2017/115953
PCT Pub. Date: Jul. 6, 2017

(65) Prior Publication Data
US 2019/0028019 A1    Jan. 24, 2019

(30) Foreign Application Priority Data

Dec. 31, 2015    (KR) ........................ 10-2015-0190666

(51) Int. Cl.
*H02M 1/32*     (2007.01)
*H02M 7/49*     (2007.01)
(Continued)

(52) U.S. Cl.
CPC ................. *H02M 1/32* (2013.01); *H02J 3/36* (2013.01); *H02M 3/142* (2013.01); *H02M 7/49* (2013.01); *H02M 2001/325* (2013.01)

(58) Field of Classification Search
CPC .......... H02M 1/32; H02M 3/142; H02M 3/06; H02M 7/48; H02M 7/49;
(Continued)

(56) References Cited

U.S. PATENT DOCUMENTS 5,986,909 A    11/1999   Hammond et al.
9,473,013 B2 *   10/2016   Singh Riar ........... H02M 7/487
(Continued)

FOREIGN PATENT DOCUMENTS

JP    2012-147613 A    8/2012
JP    2014-018028 A    1/2014
(Continued)

OTHER PUBLICATIONS

Georgios Konstantinou et al., "Active Redundant Submodule Configuration in Modular Multilevel Converters", IEEE Transactions on Power Delivery, vol. 28, No. 4, Oct., 2013, p. 2333-2341.
(Continued)

*Primary Examiner* — Adolf D Berhane
(74) *Attorney, Agent, or Firm* — Novick, Kim & Lee, PLLC; Jae Youn Kim

(57) ABSTRACT

The present invention provides a method of MMC for HVDC. According to the present invention, there is provided a redundancy control method of an MMC for HVDC, wherein the MMC includes multiple converter arms each has multiple submodules in operation and redundancy modules for spares, the method including: checking whether a breakdown of a submodule in operation of a first converter arm among the multiple converter arms occurs in a case where the all redundancy modules of the first converter arm are applied in operation; and lowering an output voltage of each submodule of other converter arms in such a manner that a DC link voltage of each of the other converter arms is controlled to be equal to a DC link voltage of the first (Continued)

converter arm when the breakdown of the submodule of the first converter arm occurs.

4 Claims, 2 Drawing Sheets

(51) Int. Cl.
  *H02M 3/142* (2006.01)
  *H02J 3/36* (2006.01)
(58) Field of Classification Search
  CPC . H02M 2001/0016; H02M 2001/0008; H02M 2001/325; H02M 5/00
  See application file for complete search history.

(56) References Cited

U.S. PATENT DOCUMENTS

| | | | | |
|---|---|---|---|---|
| 10,177,652 B2* | 1/2019 | Park | ................... | H02M 7/19 |
| 2013/0148392 A1* | 6/2013 | Inoue | ................... | H02M 7/10 |
| | | | | 363/68 |
| 2014/0146586 A1* | 5/2014 | Das | ................... | H02M 1/36 |
| | | | | 363/49 |
| 2015/0155716 A1* | 6/2015 | Balda | ................... | H02M 5/4585 |
| | | | | 363/35 |
| 2018/0006576 A1* | 1/2018 | Jung | ................... | H02J 1/00 |
| 2018/0069469 A1* | 3/2018 | Gupta | ................... | H02M 1/32 |
| 2018/0226882 A1* | 8/2018 | Jonsson | ................... | H02M 1/32 |
| 2018/0367134 A1* | 12/2018 | Chivite-Zabalza | ................... | |
| | | | | H03K 17/102 |

FOREIGN PATENT DOCUMENTS

| | | |
|---|---|---|
| KR | 10-2014-0051810 A | 5/2014 |
| WO | 2015/155112 A1 | 10/2015 |

OTHER PUBLICATIONS

Wenping Zhang et al., "Survey on Fault-Tolerant Techniques for Power Electronic Converters", IEEE Transactions on Power Electronics, vol. 29, No. 13, Dec. 2014, p. 6319-6331.

* cited by examiner

REDUNDANCY CONTROL METHOD OF MMC FOR HVDC

TECHNICAL FIELD

The present invention relates to a modular multilevel converter (MMC) applied for high voltage direct current (HVDC). More particularly, the present invention relates to a redundancy control method of an MMC for HVDC to continuously operate the MMC when an additional breakdown of a submodule in operation occurs in the case where there is no more redundancy submodule to be applied in the MMC for HVDC.

BACKGROUND ART

An MMC is a converter that uses a switching element, such as an insulated-gate bipolar transistor (IGBT), etc., which is on/off controllable, and is capable of outputting a voltage equal to or greater than a withstand voltage of the switching element. The MMC is applied in high voltage direct current (HVDC), a STATCOM, a motor drive inverter, etc.

The MMC for HVDC is composed of multiple converter arms, and each converter arm is composed of multiple submodules connected to each other in series. Each submodule includes, for example, an energy storage unit and a power semiconductor. The power semiconductor may include a power semiconductor switch and a freewheeling diode, and may be realized as, for example, an IGBT. In such a submodule, multiple power semiconductors are connected to form a so-called half-bridge or full-bridge circuit.

An HVDC system connected to such an MMC, in order to increase a rate of operation, generally includes a redundancy submodule as a spare in addition to a submodule required at a rating in preparation for a breakdown of the submodule. Thus, when the breakdown of the submodule in operation occurs, the redundancy submodule is applied such that the system may run without interruption. Accordingly, the redundancy submodule operates instead of the submodule which has broken down such that stable operation of the system may be realized.

However, in the case where there is no more redundancy submodule to be applied due to continuing breakdown of the submodule in operation, when the additional breakdown of the submodule in operation occurs, voltage imbalance between multiple phases causes interruption of the system and affects an electric power system for HVDC.

DISCLOSURE

Technical Problem

An object of the present invention is to provide a redundancy control method of an MMC for HVDC, the method lowering a DC link voltage input to each converter arm and lowering an output voltage of each submodule of a converter arm in which a breakdown does not occur so as to continuously operate the MMC when the breakdown of the submodule in operation occurs in the case where there is no more redundancy submodule to be applied in the MMC for HVDC.

Technical Solution

The present invention provides a redundancy control method of an MMC for HVDC, wherein the MMC is connected to HVDC and is composed of multiple converter arms each including multiple submodules in operation and redundancy submodules, the method including: checking whether a breakdown of a submodule in operation of a first converter arm among the multiple converter arms occurs in a case where the all redundancy submodules of the first converter arm are applied in operation; and controlling a DC link voltage supplied to the multiple converter arms to be equal to a sum of output voltages of the submodules of the first converter arm except for the submodule which has broken down and lowing an output voltage of each submodule of other converter arms according to the DC link voltage when the breakdown of the submodule in operation of the first converter arm occurs.

In the present invention, the submodules of the first converter arm except for the submodule which has broken down may be controlled to output a rated output voltage.

In the present invention, the output voltage of each submodule of the other converter aims may be equal to a value obtained by multiplying an original rated output voltage of each submodule and a value obtained by dividing the DC link voltage by a rated DC link voltage of the other converter arms.

In the present invention, the multiple submodules in operation included in each of the converter arms may output same voltages, respectively.

Advantageous Effects

According to the present invention, in the case where there is no more redundancy module to be applied in the MMC for HVDC, when the breakdown of the submodule of the MMC, which is in operation, occurs, a DC link voltage input to each converter arm of the MMC is lowered and an output voltage of each submodule of a converter arm in which a breakdown does not occur is lowered, whereby the MMC may be continuously operated, damage caused by interruption of a system may be reduced, and replacement and repair schedule for the submodule which has broken down may be flexibly adjusted.

MODE FOR INVENTION

Hereinafter, preferred embodiments of the present invention will be described with reference to the accompanying drawings. Also, in describing the present invention, the detailed descriptions of known related constitutions or functions thereof may be omitted if they make the gist of the present invention unclear.

Figure 1:
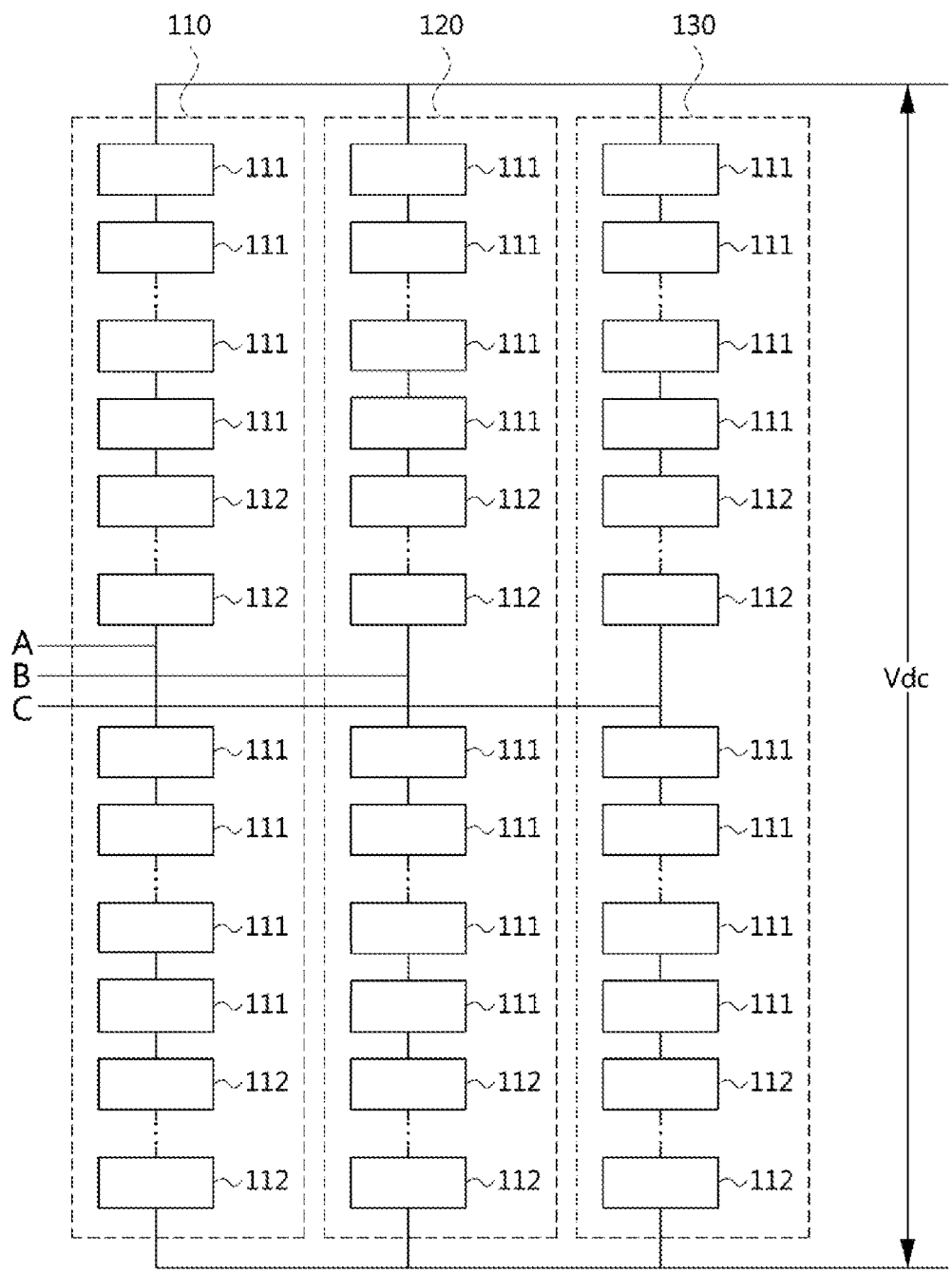
FIG. 1 is a diagram illustrating a schematic configuration of an MMC for HVDC according to an embodiment of the present invention.

FIG. 1 is a diagram illustrating a schematic configuration of an MMC for HVDC according to an embodiment of the present invention.

As shown in FIG. 1, an MMC 100 for HVDC according to the present invention is composed of three converter arms 110, 120, and 130, and each of the converter arms 110, 120, and 130 includes multiple submodules 111 connected to each other in series, and redundancy modules 112 which are spare modules. The submodules 111 participate in operation, and when a breakdown of the submodules 111 in operation occurs, the redundancy submodule 112 is controlled to participate in operation by being applied instead of the submodule.

According to a DC link voltage Vdc input to each of the converter arms 110, 120, and 130, a voltage of each submodule 111 is controlled. Also, the same AC voltages with different phases are output through AC voltage terminals A, B, and C, which are load connection terminals, and these output voltages may be connected to a three-phase load, e.g. a three-phase AC power system.

The submodules 111 included in each of the converter arms 110, 120, and 130 output the same voltages during operation, and the voltages are added by the series connection and phase control of the submodules 111 of each of the converter arms 110, 120, and 130 and are output as an AC voltage through the AC voltage terminals A, B, and C.

When the breakdown of the submodule 111 in operation occurs or when operation thereof is impossible for an arbitrary reason, the redundancy module 112 which is a spare module is applied as a replacement module for the submodule 111 which has broken down.

As described above, the MMC 100 for HVDC according to the present invention generally includes the redundancy submodules 112 which are the spare modules in addition to the submodules 111 participating in operation, which are required at a rating. Accordingly, even when the breakdown of the submodule 111 in operation occurs, the system to which the MMC for HVDC is applied may operate normally without interrupting operation of the system by applying the redundancy submodule 112.

However, when in one converter arm of the multiple converter arms 110, 120, and 130, for example, when in the first converter arm 110, the breakdown of the submodule 111 in operation occurs in the case where all redundancy submodules 112 are applied, there is no more redundancy submodule 112 to be applied. Thus, the output voltages of the submodules 111 except for the submodule 111 which has broken down are added to be the output voltage of the first converter arm 110.

In this case, the output voltage of the first converter arm 110 has a smaller value than the output voltages of the other converter arms 120 and 130, and thus imbalance occurs in three-phase AC power. In the case of the MMC 100 for HVDC, when imbalance occurs in the AC power which is output, the imbalance may cause a problem with the load, and thus a function of interrupting the system is performed.

In order to prevent interruption in operation of the system, the MMC 110 for HVDC adjusts the DC link voltage Vd, which is an input voltage, on the basis of output voltages of submodules of the first converter arm 110 except for the submodule which has broken down, and lowers the output voltage of each submodule 111 of the other converter arms 120 and 130 except for the first converter arm 110 according to the adjusted DC link voltage, whereby output voltages of respective converter arms 110, 120, and 130 are set to be the same and the system operates normally.

Here, the DC link voltage Vdc supplied to each of the converter arms 110, 120, and 130 is changed to the sum of output voltages of submodules 111 of the first converter arm 110 except for the submodule 111 which has broken down. Here, the output voltages of submodules 111 of the first converter arm 110 except for the submodule 11 which has broken down are controlled to a rated output voltage.

Next, except for the first converter arm 110, output voltages of the submodules 111 of the other converter arms 120 and 130 are lowered depending on the change in the DC link voltage Vdc supplied to each of the converter arms 110, 120, and 130. The output voltage of each submodule 111 of the other converter arms 120 and 130 is the result of multiplying the original rated output voltage of each submodule 111 and a value that is obtained by dividing the adjusted DC link voltage by the original rated Vdc of the other converter arms 120 and 130.

For example, it is assumed in the MMC that each of the converter arms 110, 120, and 130 includes 10 submodules, a rated DC link voltage Vdc input to each of the converter arms 110, 120, and 130 is 50 V, and the output voltage of each submodule is 5 V. Here, when assuming that two of submodules of the first converter arm 110 have broken down and there is no more redundancy module to be applied, the number of submodules operable in the first converter arm 110 is eight and the DC link voltage Vdc is adjusted to 40 V by multiplying eight submodules and 5 V which is the output voltage of each submodule.

Also, except for the first converter arm 110, the DD link voltage Vdc of each of the other converter arms 120 and 130 is also 40 V, and thus the output voltage of each submodule of the other converter arms 120 and 130 is controlled to 4 V, which is a value obtained by multiplying the original output voltage, i.e. 5 V, and 40 V/50 V, according to the Vdc, i.e. 40 V. That is, eight submodules of the first converter arm 110 of which two submodules have broken down are controlled to 5 V equal to the original rated output voltage, and thus the DC link voltage Vdc input to each converter arm is controlled to 40 V which is 10 V smaller than the original rated voltage 50 V. Also, the output voltage of each of 10 submodules for each of the other converter arms 120 and 130 is controlled to 4 V according to the DC link voltage Vdc which is 40 V.

Figure 2:
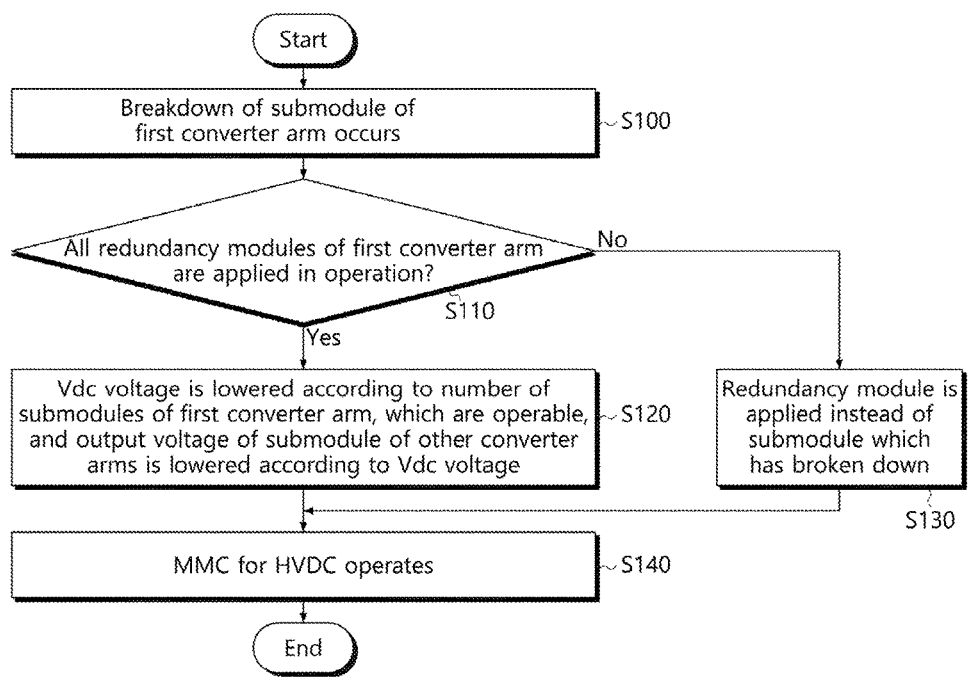
FIG. 2 is a flowchart illustrating a redundancy control method of an MMC for HVDC according to an embodiment of the present invention.

FIG. 2 is a flowchart illustrating a redundancy control method of an MMC for HVDC according to an embodiment of the present invention.

Referring to FIG. 2, in the MMC 100 for HVDC, wherein the MMC is connected to HVDC and is composed of multiple converter arms 110, 120, and 130, and each of the converter arms 110, 120, and 130 includes multiple submodules 111 in operation and redundancy submodules 112 which are spare module, when the breakdown of the submodule 111 of the first converter arm 110 occurs among the multiple converter arms 110, 120, and 130 at step S100, whether there is a redundancy submodule 112 to replace the submodule 111 in the first converter arm 110 is checked at step S110.

In the case where all redundancy submodules 112 of the first converter arm 110 are applied in operation, when there is no more redundancy submodule 112 to be applied for replacement, the DC link voltage Vdc supplied to the multiple converter arms 110, 120, and 130 is adjusted to be equal to the sum of output voltages of normal submodules 111 of the first converter arm 110 except for the submodule 111 which has broken down, and the output voltage of each submodule 111 of the other converter arms 120 and 130 is lowered according to the adjusted DC link voltage at step S120, thereby keep operating the MMC 100 for HVDC at step S140.

Here, the output voltages of remaining submodules 111, in which the breakdown does not occur, of the first converter arm 110 remain the same, and except for the first converter arm 110, the output voltage of each submodule 111 of the other converter arms 120 and 130 is obtained by multiplying the original output voltage and a value that is obtained by dividing the adjusted DC link voltage Vd by each submodule 111 of the first converter arm 110 by the rated DC link voltage of the other converter arms 120 and 130.

The output voltage of each submodule 111 of the other converter arms 120 and 130 is reduced than the original rated output voltage, and as the DC link voltage Vd which is input decreases, the total active power output from each converter arm decreases. However, interruption in operation of the system may be delayed by a desired time, and replacement and repair schedule for the module which has broken down may be flexibly adjusted.

On the contrary, when there is a redundancy module 112 to replace the submodule 111 which has broken down, the redundancy module 113 is applied at step S130, and the MMC 100 for HVDC keeps operating at step S140.

The preferred embodiments of the present invention are described in detail, but the present invention is not limited to the embodiments. While the present invention has been particularly shown and described with reference to exemplary embodiments thereof, it will be obvious to those of ordinary skill in the art that various changes and modifications in form and details may be made therein without departing from the spirit and scope of the present invention as disclosed in the accompanying claims.

The invention claimed is:

1. A redundancy control method of a modular multilevel converter (MMC) for high voltage direct current (HVDC), wherein the MMC has multiple converter arms each including multiple submodules and redundancy submodules, the method comprising:

checking whether a breakdown of a submodule in operation of a first converter arm among the multiple converter arms occurs in a case where all of the redundancy submodules of the first converter arm are applied and in operation; and controlling a DC link voltage supplied to the multiple converter arms to be equal to a sum of output voltages of the submodules of the first converter arm except for the submodule which has broken down and lowering an output voltage of each submodule of the other converter arms according to the DC link voltage when the breakdown of the submodule in operation of the first converter arm occurs, wherein a number of submodules operable in the first converter arm except for the submodule which has broken down is different from a number of submodules operable in each of the other converter arms, and wherein each of the output voltages of the operable submodules of the first converter arm is different from each of the output voltages of the operable submodules of each of the other converter arms.

2. The method of claim 1, wherein the submodules of the first converter arm except for the submodule which has broken down are controlled to output a rated output voltage.

3. The method of claim 1, wherein the output voltage of each submodule of the other converter arms is equal to a value obtained by multiplying an original rated output voltage of each submodule and a value obtained by dividing the DC link voltage by a rated DC link voltage of the other converter arms.

4. The method of claim 1, wherein the multiple submodules in operation included in each of the converter arms output same voltages, respectively.

* * * * *